United States Patent
Kim et al.

(10) Patent No.: US 9,584,807 B2
(45) Date of Patent: Feb. 28, 2017

(54) METHOD AND APPARATUS FOR MOTION ESTIMATION IN A VIDEO SYSTEM

(71) Applicant: SAMSUNG ELECTRONICS CO., LTD., Suwon-si (KR)

(72) Inventors: Seung-Gu Kim, Seoul (KR); Tae Gyoung Ahn, Yongin-si (KR); Se-Hyeok Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 546 days.

(21) Appl. No.: 13/901,148

(22) Filed: May 23, 2013

(65) Prior Publication Data

US 2014/0098879 A1 Apr. 10, 2014

(30) Foreign Application Priority Data

Oct. 10, 2012 (KR) .................. 10-2012-0112331

(51) Int. Cl.
*H04N 7/36* (2006.01)
*H04N 19/51* (2014.01)
(Continued)

(52) U.S. Cl.
CPC ..... *H04N 19/00684* (2013.01); *H04N 19/553* (2014.11); *H04N 19/521* (2014.11)

(58) Field of Classification Search
CPC ........... H04N 19/00684; H04N 19/553; H04N 19/55; H04N 19/521; H04N 19/527;
(Continued)

(56) References Cited

U.S. PATENT DOCUMENTS 6,252,974 B1 * 6/2001 Martens .................. G06T 7/206
345/422
6,292,227 B1 * 9/2001 Wilf ..................... H04N 5/2628
348/587
(Continued)

OTHER PUBLICATIONS

"True-Motion Estimation with 3D Recursive Search Block Matching" by Gerard de Haan et al., © 1993 IEEE 1051-8215.*

*Primary Examiner* — Chikaodili E Anyikire
*Assistant Examiner* — Dramos I Kalapodas
(74) *Attorney, Agent, or Firm* — Sughrue Mion, PLLC

(57) ABSTRACT

The present invention relates to a method and apparatus for motion estimation (ME) of a video in a video system. The method includes estimating an occlusion area by using a pattern map; removing a motion vector which corresponds to the estimated occlusion area from a motion vector field, and outputting remaining motion vectors as first candidate motion vectors; collecting motion vectors which correspond to an area of interest in the input video, detecting a representative motion vector which represents the collected motion vectors, and comparing the first candidate motion vectors with the representative motion vector removing a first candidate motion vector having a difference in a weight value from the representative motion vector which is greater than a first threshold value and outputting the remaining first candidate motion vectors as second candidate motion vectors; and performing a motion estimation operation by using the second candidate motion vectors.

11 Claims, 10 Drawing Sheets

(51) Int. Cl.
*H04N 19/553* (2014.01)
*G06K 9/00* (2006.01)
*H04N 7/12* (2006.01)
*H04N 19/513* (2014.01)

(58) Field of Classification Search
CPC  H04N 7/12; H04N 9/75; H04N 5/272; H04N 5/2723; H04N 5/2628; G06K 9/62
See application file for complete search history.

(56) References Cited

U.S. PATENT DOCUMENTS

| | | | | |
|---|---|---|---|---|
| 7,058,205 B2* | 6/2006 | Jepson | ............... | G06K 9/00228 382/103 |
| 7,489,350 B2* | 2/2009 | De Haan | ................. | G06T 5/003 348/252 |
| 7,526,102 B2* | 4/2009 | Ozer | ................. | G06K 9/00228 382/103 |
| 8,064,644 B2* | 11/2011 | Kokaram | ............... | G06T 7/2006 375/240.27 |
| 8,780,110 B2* | 7/2014 | Ben Himane | ............ | G06K 9/46 345/419 |
| 2003/0048849 A1* | 3/2003 | Tomita, Jr. | ............ | G06T 7/2033 375/240.25 |
| 2004/0252763 A1* | 12/2004 | Mertens | ............... | H04N 19/503 375/240.16 |
| 2004/0252764 A1* | 12/2004 | Hur | ........................ | H04N 5/145 375/240.16 |
| 2005/0141614 A1* | 6/2005 | Braspenning | ......... | G06T 7/2026 375/240.16 |
| 2005/0163355 A1* | 7/2005 | Mertens | ............... | H04N 19/553 382/128 |
| 2007/0160144 A1* | 7/2007 | Lu | .......................... | H04N 19/56 375/240.16 |
| 2008/0151106 A1* | 6/2008 | Verburgh | ............... | H04N 7/014 348/452 |
| 2008/0188717 A1* | 8/2008 | Chen | .................. | A61B 1/00096 600/199 |
| 2008/0232716 A1* | 9/2008 | Plagne | .................. | G06T 7/0051 382/285 |
| 2008/0285806 A1* | 11/2008 | Kokaram | ............... | G06T 7/2006 382/107 |
| 2010/0231593 A1* | 9/2010 | Zhou | ..................... | G06T 3/4007 345/428 |
| 2010/0284627 A1* | 11/2010 | Lin | ........................ | H04N 5/145 382/275 |
| 2012/0105718 A1* | 5/2012 | Ono | ........................ | H04N 5/21 348/447 |
| 2012/0327172 A1* | 12/2012 | El-Saban | ........... | G06K 9/00228 348/14.02 |
| 2013/0170551 A1* | 7/2013 | Liu | ........................ | H04N 7/014 375/240.16 |

\* cited by examiner

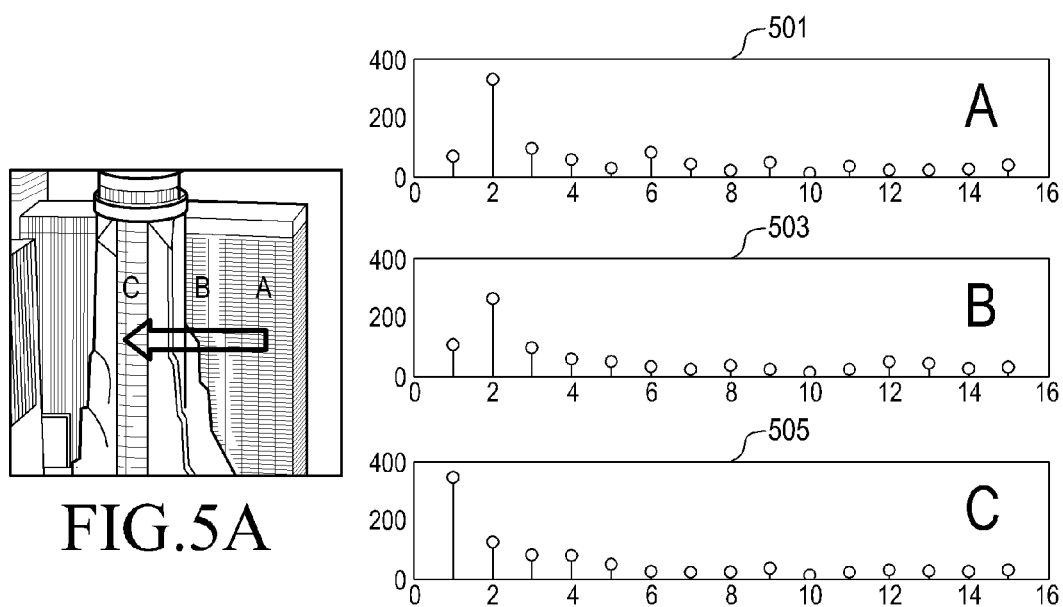
FIG.5A
FIG.5B
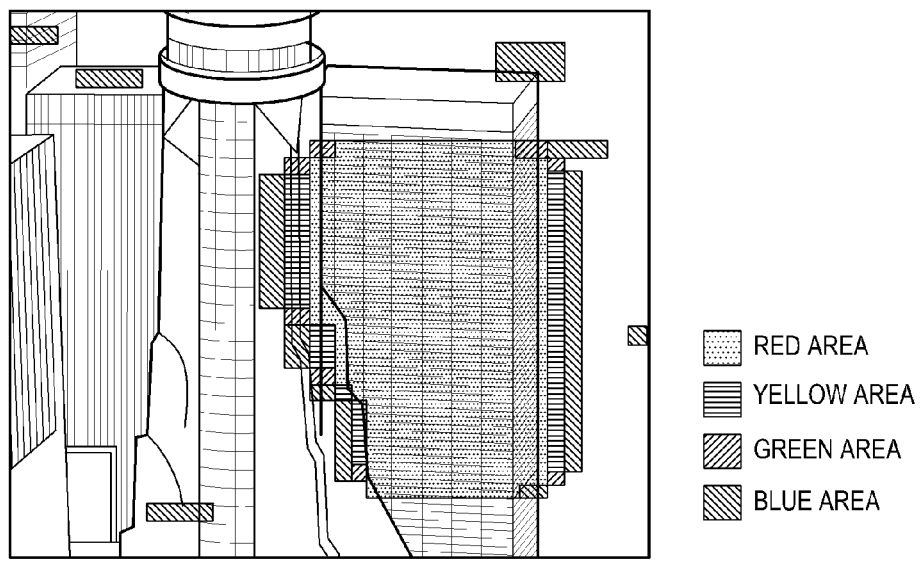
RED AREA
YELLOW AREA
GREEN AREA
BLUE AREA
FIG.5C

METHOD AND APPARATUS FOR MOTION ESTIMATION IN A VIDEO SYSTEM

PRIORITY

This application claims the priority under 35 U.S.C. §119(a) to Korean Application Serial No. 10-2012-0112331, which was filed in the Korean Intellectual Property Office on Oct. 10, 2012, the entire content of which is hereby incorporated herein by reference.

BACKGROUND

1. Field

The inventive concept relates to a method and apparatus for motion estimation (ME) of a video in a video system.

2. Description of the Related Art

In a video system, motion estimation (ME) is performed between respective input frames to compress data or to convert a frame rate. In the video system, a widely used method of performing ME on a temporal axis of the video divides a target video into pixels or pixel blocks, locates a portion most similar to each pixel or pixel block in a previous and a subsequent frame of a temporal order, and calculates a change of a coordinate value. The method will be described with reference to an example shown in FIGS. 1A, 1B and 1C FIGS. 1A, 1B and 1C are a view illustrating an example of a motion estimation (ME) method in a known video system.

Referring to FIG. 1B, in a known ME method, an image is divided into grids and a portion similar to each divided frame is located in a previous frame ft-1 (FIG. 1A), in a current frame ft (FIG. 1B) and a subsequent frame ft+1 (FIG. 1C). Specifically, in order to estimate temporal motion of a block shown in a bold line in a frame ft in FIG. 1B, a similar block is located in the frame ft-1 (FIG. 1A) and the frame ft+1 (FIG. 1C) by using a cost function such as a mean square error (MSE) and a sum of absolute difference (SAD). A change of a coordinate value between these blocks is calculated to obtain a quantitative motion vector (MV) of the target block.

The conventional ME method as shown in FIGS. 1A, 1B and 1C have a satisfactory accuracy of estimation in case of a video composed of an ordinary natural object. However, in case of a peculiar video as shown in FIG. 2, the accuracy of the motion estimation is not reliable.

FIG. 2 is a view illustrating an example of an image which includes an area having a periodic characteristic (pattern).

When an area in which the same pattern is repeated exists within the video as shown in FIG. 2, respective divided blocks of a corresponding area are very similar to one another, such that an accurate matching block is difficult to locate by using the cost function. This will be described with reference to FIG. 3s. 3A, 3B and 3C.

FIG. 3s. 3A, 3B and 3C are views illustrating a known ME method performed on the image of FIG. 2.

Referring to FIGS. 3A, 3B and 3C, it may not be easy to locate which block in a frame ft-1 (FIG. 3A) or a frame ft+1 (FIG. 3C) corresponds to a block shown in a bold line in a frame ft (FIG. 3B) simply by comparing divided blocks of the video in order to verify the matching block.

As described above, in the known ME method, an ME result may not be accurate depending on the video, which results in a negative effect being generated in a subsequent video processing process using such an intermediate result. As a result, a negative effect is generated in a final result of an entire video processing. For example, in case of a video codec, a size of a compressed video may be increased, or a video quality may deteriorate if the amount of data of the compressed video is limited. In case of a frame rate up conversion (FRUC), the resulting video quality may be deteriorated as a result of erroneous motion estimation.

In order to prevent deterioration of the video quality in the conventional ME method, an assumption is made that an area detected as having a periodic pattern does not have a motion (a zero motion vector is assigned to attempt a local fall-back) or an ME result of the area detected as having the periodic pattern with an overall motion (global motion vector) of a screen may be replaced. However, these conventional ME methods cannot sufficiently compensate for inaccuracy of the ME result and, as a result, cannot solve the problems of deterioration of the video quality or of an increase in the size of the compressed video.

SUMMARY

Accordingly, an aspect of the inventive concept is to provide an apparatus and method for motion estimation (ME) in a video system.

Another aspect of the inventive concept is to provide an apparatus and method for ME in a video system in which a candidate motion vector (MV) for effectively performing the ME is selected when a video having a periodicity is input and the ME is performed using the candidate MV.

In accordance with an aspect of the inventive concept, a method of estimating a motion of a video, in a video system, is provided. The method includes estimating an occlusion area by using a pattern map which is a result of detecting an object or areas having a periodic characteristic in an input video. The method further includes removing a motion vector which corresponds to the estimated occlusion area from a motion vector field, according to a result of motion estimation previously performed, and outputs remaining motion vectors as first candidate motion vectors; collecting motion vectors which correspond to an area of interest in the input video from the motion vector field, detecting a representative motion vector representative of the collected motion vectors, and respectively comparing the first candidate motion vectors with the representative motion vector; removing a first candidate motion vector having a difference in a weight value from the representative motion vector, which is greater than a first threshold value, and outputting the remaining first candidate motion vectors as second candidate motion vectors; and performing a motion estimation operation using the second candidate motion vectors.

In accordance with another aspect of the inventive concept, an apparatus for estimating a motion of an image in a video system is provided. The apparatus includes an occlusion area estimator which is configured to estimate an occlusion area by using a pattern map, which is a result of detecting an object or an area having a periodic characteristic in an input video; a noise remover which is configured to remove a motion vector which corresponds with the estimated occlusion area from a motion vector field, according to a previously performed result of motion estimation in order to output remaining motion vectors as first candidate motion vectors, wherein the estimation is configured to collect motion vectors which correspond to an area of interest in the video input from the motion vector field, which is configured to detect a representative motion vector which represents the collected motion vectors, in order to respectively compare the first candidate motion vectors with the representative motion vector, and the motion estimator is configured to remove a first candidate motion vector having a difference in a weight value from the representative motion vector, which is greater than a first threshold value to output the remaining first candidate motion vectors, as second candidate motion vectors; and a motion estimation processor which is configured to perform a motion estimation operation using the second candidate operation vectors.

BRIEF DESCRIPTION OF THE DRAWINGS

The above and other aspects, features, and advantages of the inventive concept will be more apparent from the following detailed description taken in conjunction with the accompanying drawings, in which:

FIGS. 5A, 5B and 5C are views illustrating an operation of an occlusion area estimator 410 in an ME apparatus according to an exemplary embodiment of the inventive concept;

DETAILED DESCRIPTION OF THE EXEMPLARY EMBODIMENTS

Hereinafter, various exemplary embodiments of the inventive concept will be described with reference to the accompanying drawings. In the following description, a description will only be made regarding parts required to help with an understanding of the inventive concept. This description is provided and a description of other parts will be omitted in order to avoid obscuring the subject matter of the inventive concept.

The exemplary embodiments suggest an apparatus and a method for motion estimation (ME) in which an occlusion area is effectively removed from an input video by using a pattern map, which is a result of detecting an object or areas having a periodic characteristic within the input video. A candidate motion vector (MV) for the ME is selected by using MVs in which the occlusion area is removed, and an ME operation is performed based on the selected candidate MV. The pattern map is characterized by storing a result of detecting a pixel or pixel blocks having the periodic characteristic within a video, based on interpretation of a temporal, spatial, or frequency domain in the input video.

To this end, an apparatus and a method for ME in a video system according to an exemplary embodiment of the inventive concept will be described in detail.

Figure 1A:
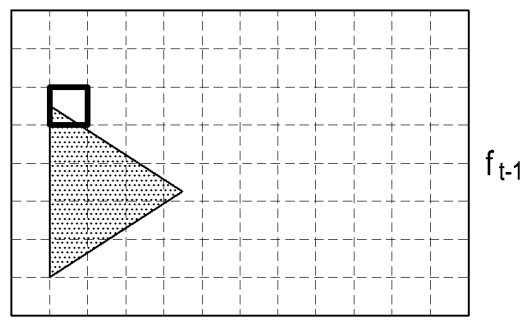
FIGS. 1A, 1B and 1C are views illustrating an example of a method of motion estimation (ME) in a known video system.
Figure 1B:
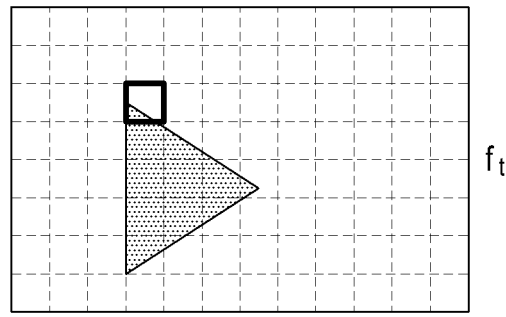
Figure 1C:
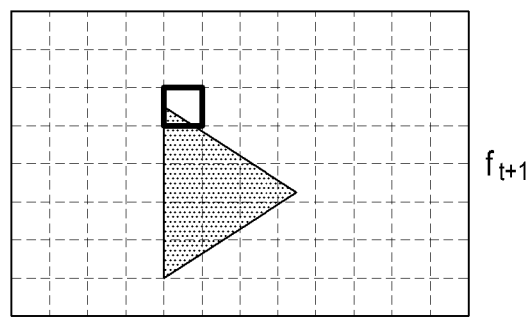
Figure 2:
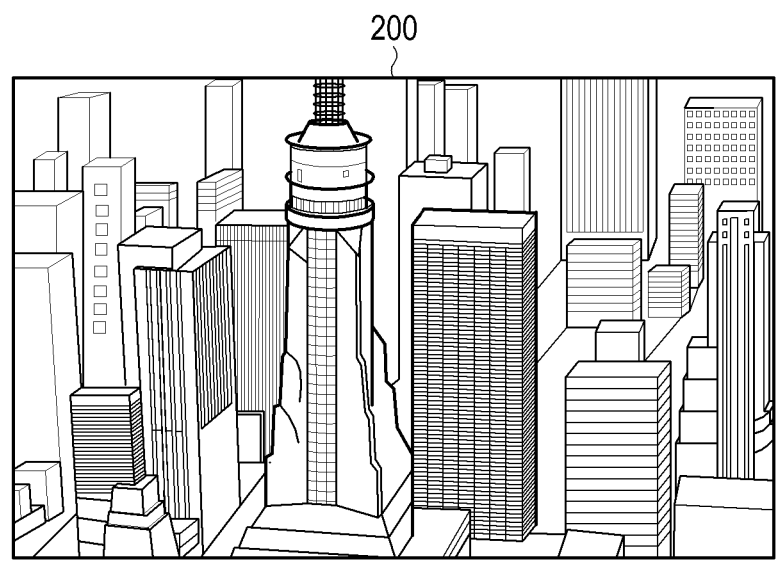
FIG. 2 is a view illustrating an example of an image including an area having a periodic pattern.
Figure 3A:
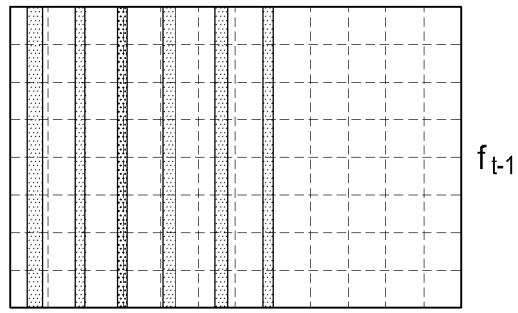
FIGS. 3A, 3B and 3C are views illustrating a known ME method performed on the image of FIG. 2.
Figure 3B:
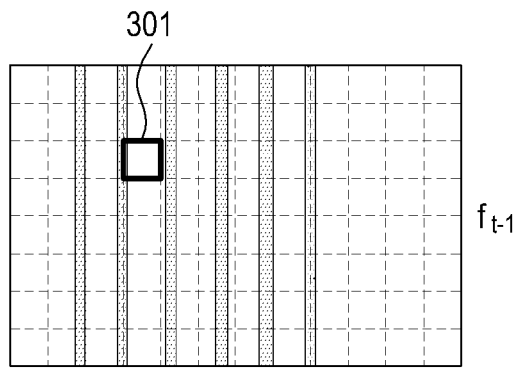
Figure 3C:
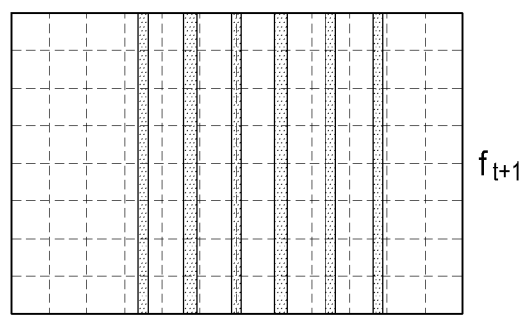
Figure 4:
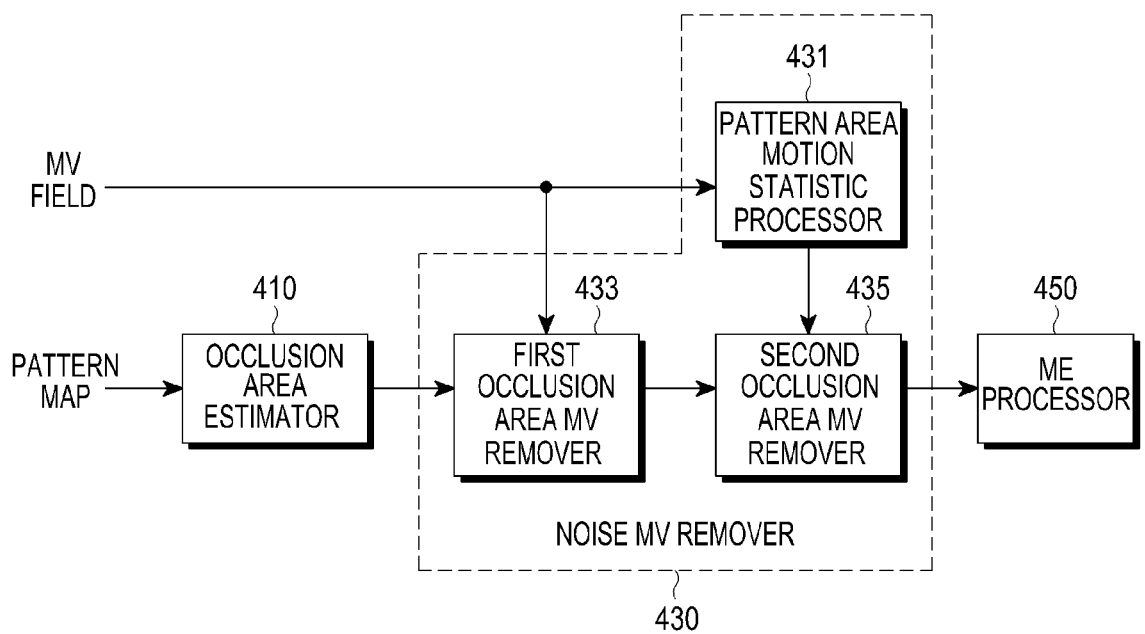
FIG. 4 is a view illustrating an ME apparatus in a video system according to an exemplary embodiment of the inventive concept.

FIG. 4 is a view illustrating an ME apparatus in a video system according to an exemplary embodiment of the inventive concept.

Referring to FIG. 4, an ME apparatus in a video system according to an exemplary embodiment of the inventive concept includes an occlusion area estimator 410, a noise MV remover 430, and an ME processor 450. The noise MV remover 430 includes a pattern area motion statistic processor 431, a first occlusion area MV remover 433, and a second occlusion area MV remover 435.

Noise MV remover 430 receives MVs (hereinafter, an MV field) of a previously estimated ME and the occlusion area estimator 410 receives a pattern map from an apparatus (not shown) which detects a periodic area in an input video.

By way of reference, a method of extracting the pattern map in the apparatus which detects the periodic area includes a sign change detection method which measures how frequently bright and dark areas of a video are repeated and how great a difference exists between the bright and the dark areas which are repeated, and a pixel spectrum based detection method which extracts pixel samples and analyzing a frequency characteristic of corresponding pixel samples to examine whether a peak frequency component exists. Also, the pattern map stores a result of calculating a periodic characteristic (periodicity) and a periodicity intensity thereof (a ratio of a strongest frequency component to a sum of an entire frequency component) of respective areas which compose the video (e.g., respective grid areas shown in FIGS. 1A, 1B, and 1C or FIGS. 3A, 3B and 3C).

The occlusion area estimator 410 receives the pattern map which is a result of detecting the object or areas having the periodicity in the input video and estimates an occlusion area by determining whether an area having the periodicity included in the video is adjacent to an area having a different characteristic (i.e., an area not having the periodicity). Here, the occlusion area is an area in which a part of a current frame fc does not exist in a previous frame fc−1 or a subsequent frame fc+1 of a temporal order. The occlusion area cannot be considered to have a previously accurate ME result because a direct comparison with a pixel data is impossible. Therefore, in calculating a candidate MV which is to be recommended for a current ME, MVs having a low reliability of the occlusion area should be excluded.

An operation of estimating the occlusion area performed by the occlusion area estimator 410 is described with reference to FIG. 5.

FIG. 5 is a view illustrating an operation of an occlusion area estimator 410 in an ME apparatus according to an exemplary embodiment of the inventive concept.

Referring to FIG. 5A, in a case where an area (area A 501) having the periodicity in the video is adjacent to an area (area C 505) not having the periodicity, a frequency component (FIG. 5B) which prevails in a frequency spectrum is decreased as it proceeds from the area A to area C (501~505). Based on such characteristic of the frequency spectrum, the occlusion area estimator 410 measures a difference in the periodicity intensity between a target block (a block for which the ME is performed to obtain its motion) and an adjacent block in the pattern map, and in response to the difference therebetween being greater than a predetermined value, two blocks are determined as a part of a boundary between the area having the periodicity and an area not having the periodicity.

Namely, referring to a farthest right side area of FIG. 5C, a red or yellow area represents blocks having a stronger periodicity intensity, and a blue or green area represents blocks having a weaker periodic intensity. Here, since the occlusion area is generated in a boundary part of the object, i.e., a part in which the difference in the periodicity intensity is greater, the yellow areas and the blue areas in the example of FIG. 5C may be an estimated occlusion area.

Referring now to FIG. 4, the noise MV remover 430 removes an MV at a location which corresponds to the occlusion area estimated by the occlusion area estimator 410 from an input MV field to output remaining MVs as first candidate MVs. The noise MV remover 430 detects a representative MV which represents the input MV field, compares weight values of respective first candidate MVs and a weight value of the representative MV, removes, among the first candidate MVs, the first candidate MV having a difference greater than a preset threshold value from the representative MV, and outputs remaining MVs as second candidate MVs.

Also, the ME processor 450 receives the second candidate MVs and performs an ME operation by using the second candidate MVs.

An ME apparatus according to an exemplary embodiment of the inventive concept divides the input video into a window area having a plurality of blocks of a predefined block size (N1×M1), determines a weight of each block included in a window, and estimates and removes the occlusion area according to the determined weight. Here, each block included in the window area has one MV, and a target block of which motion is to be tracked exists at a center of the window area. For illustrative purposes, remaining blocks other than the target block within the window area are defined as candidate block and a block adjacent to the candidate block within another window area is defined as a neighboring block, and the window area is assumed to have a 3×3 block size.

The occlusion area estimator 410 may estimate the occlusion area by indicating whether the area having the periodicity included in the video is adjacent to the area not having the periodicity in a weight matrix by using the input pattern map. Here, the occlusion area estimator 410 moves from one block to another to determine a weight value thereof within the window area having a block size of 3×3. In response to the candidate block included in the window area having a lower periodicity intensity than the target block, the occlusion area estimator 410 decreases an initial weight value by 1, and in response to a block having a lower periodicity intensity than the target block existing in neighboring blocks of the candidate block, the weight value is again decreased by 1. In other words, the weight value of a corresponding MV in the MVs included in the window area is determined depending on whether a location at which the corresponding MV is collected is the occlusion area, and the more neighboring blocks are estimated as the occlusion area, the greater the weight value thereof is decreased. The weight matrix determined in the above described manner may be as shown in FIG. 6.

Figure 6:
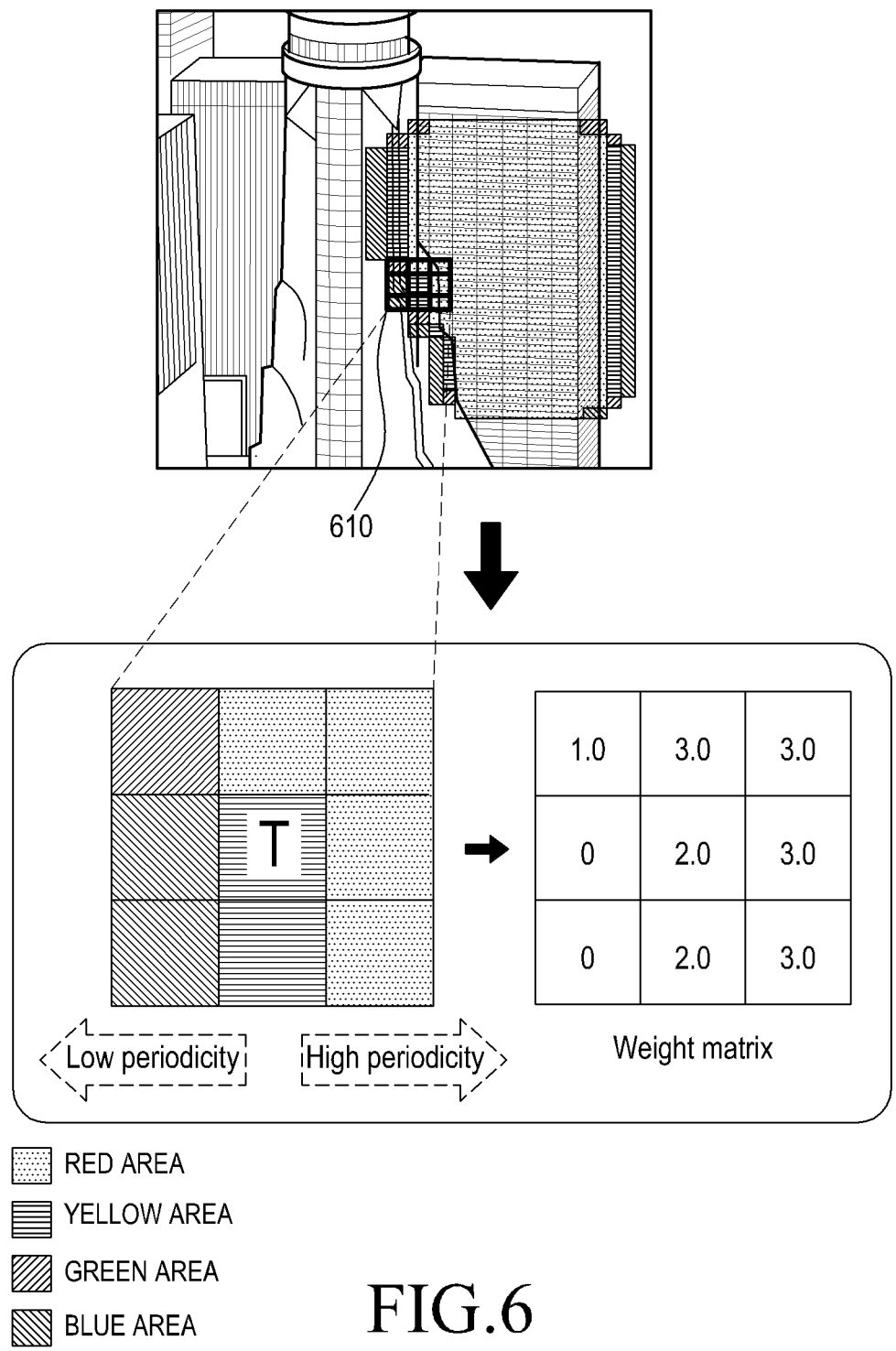
FIG. 6 is a view illustrating a weight matrix output from an occlusion area estimator 410 of an ME apparatus according to an exemplary embodiment of the inventive concept.

FIG. 6 is a view illustrating a weight matrix output from the occlusion area estimator 410 of an ME apparatus according to an exemplary embodiment of the inventive concept.

Referring to FIG. 6, in a weight matrix which corresponds to an area identified by reference number 610, it is shown that a weight of a block which corresponds to the area having the periodicity has a greater value than a weight of a block which corresponds to the area not having the periodicity. Also, in the weight matrix, a block displayed as "0" is a part which is not used in a subsequent process, and the lower the weight value is, the lower the importance a block has in the subsequent process.

Referring now to FIG. 4, after the first occlusion area MV remover 433 receives the MV field and the weight matrix, the first occlusion area MV remover 433 removes an MV having a weight value less than a predefined threshold value, from among weight values included in the weight matrix in the input MV field, and the remaining MVs are output as the first candidate MVs.

After the pattern area motion statistic processor 431 receives the MV field, the pattern area motion statistic processor 431 collects the MVs within the input MV field in the window area having a block size of N2×M2 (e.g., 8×7). Also, the pattern area motion statistic processor 431 detects a representative MV which can represent the MV field collected in the window area having an 8×7 block size. Here, the pattern area motion statistic processor 431 may detect the representative MV by using a K-mean clustering method as shown in FIG. 7.

Figure 7:
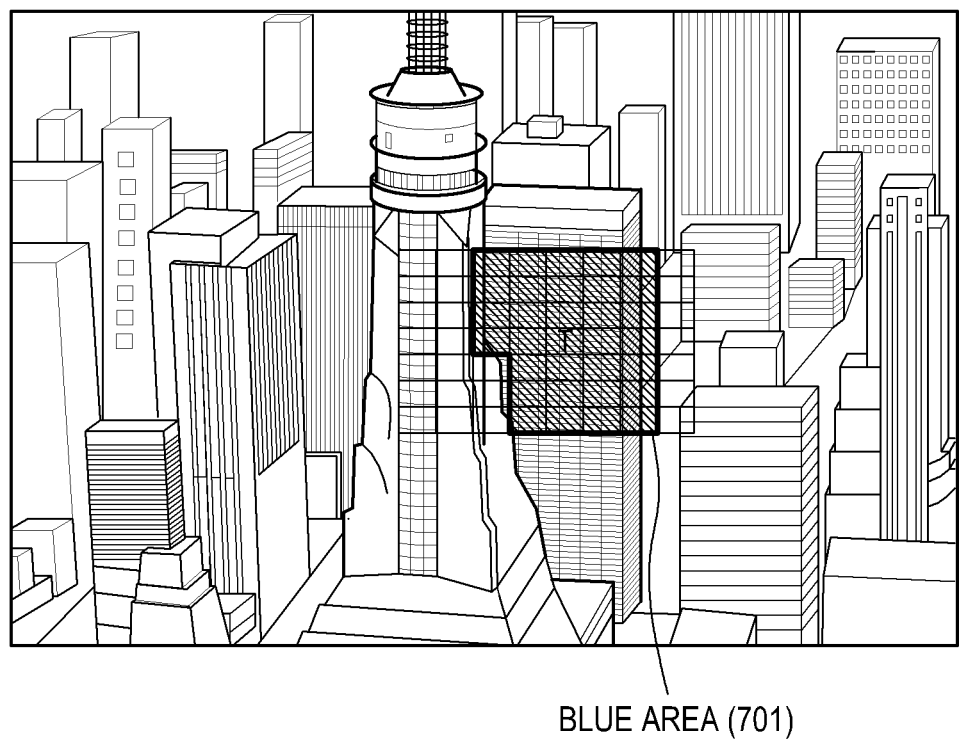
FIG. 7 is a view illustrating an example of collecting a motion vector (MV) which corresponds to a window area from an MV field by a pattern area motion statistical processor 431 according to an exemplary embodiment of the inventive concept.

FIG. 7 is a view illustrating an example of collecting a motion vector (MV) field in a window area by the pattern area motion statistic processor 431 according to an exemplary embodiment of the inventive concept.

Referring to FIG. 7, among the MVs included in the input MV field, the pattern area motion statistic processor 431 may collect the MV of an area (blue area 701) having a specific condition (e.g., portions detected as an area having a periodic pattern) in the window area having the 8×7 block size.

Figure 8:
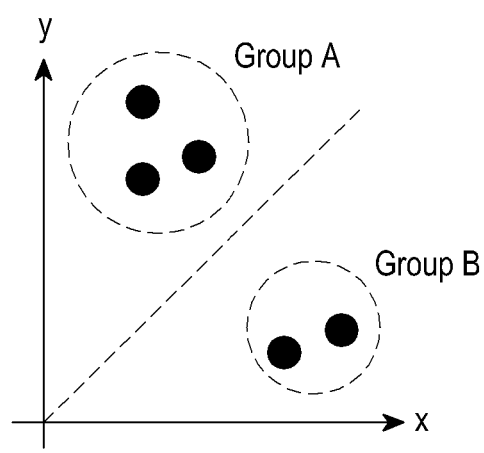
FIG. 8 is a view illustrating a method of K-mean clustering applied to a pattern area motion statistical processor 431 according to an exemplary embodiment of the inventive concept.

FIG. 8 is a view illustrating a K-mean clustering method applied to the pattern area motion statistical processor 431 according to an exemplary embodiment of the inventive concept. Referring to FIG. 8, the pattern area motion statistic processor 431 clusters the collected MVs and then detects a representative MV (e.g., an average value of the MVs of a cluster) of a cluster which is to be transmitted to the second occlusion area MV remover 435.

Referring now to FIG. 4, the second occlusion area MV remover 435 receives the representative MV which represents the window area having N2×M2 block size from the pattern area motion statistic processor 431 and the first candidate MVs from the first occlusion area MV remover 433. The second occlusion area MV remover 435 compares the representative MV with the first candidate MVs, respectively, to remove, from among the first candidate MVs, a first candidate MV which has a difference from the representative MV that is greater than a preset threshold value and outputs the remaining MVs as the second candidate MVs.

Also, the ME processor 450 receives the second candidate MVs from the second occlusion area MV remover 435 and estimates an accurate ME by performing a local search or a full search with respect to particular areas designated by the input second candidate MVs. Here, the ME processor 450 adjusts a search range with respect to the particular areas (i.e., area having the periodicity) designated by the second candidate MVs to perform searching. The reason for this is that a plurality of blocks having similar shapes are included in a case of a exceedingly broad search range and the similarly shaped blocks may produce a plurality of distorted block matching points. An exemplary embodiment of a method of adjusting the search range may use the following Equation 1.

$$\text{Search Range} = \pm\left(\frac{N}{\arg\max\limits_{k\in S}(|X[k]|)}\right)/2 \quad \text{[Equation 1]}$$

In the above Equation 1, N represents a number of sample pixels used at each predefined location of the video to detect the periodic area in the video, X[k] represents a Fourier coefficient after transforming a sample pixel x[n] into a frequency domain, and S represents a group of Fourier coefficients.

Figure 9:
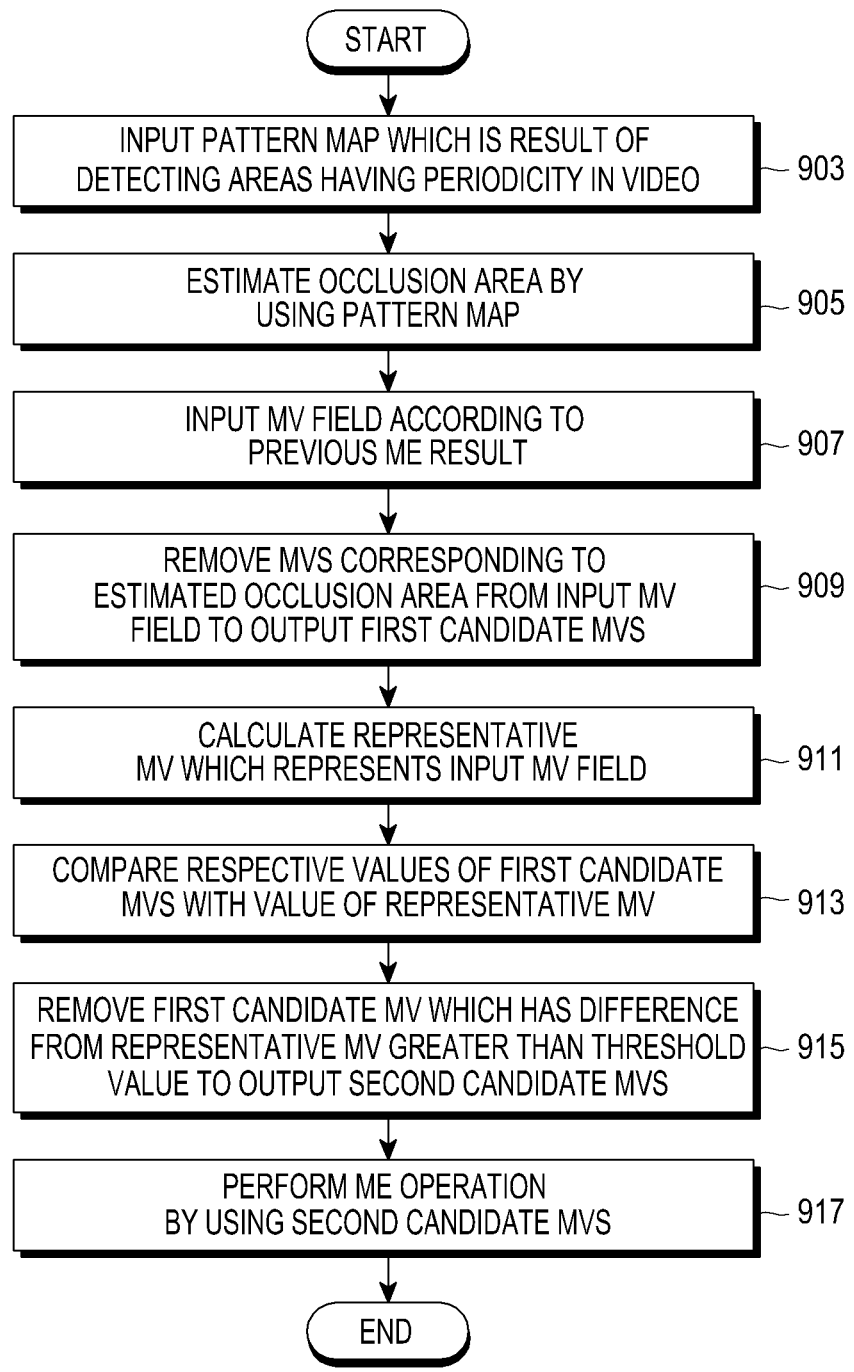
FIG. 9 is a view illustrating an ME method in a video system according to an exemplary embodiment of the inventive concept.

FIG. 9 is a view illustrating an ME method in a video system according to an exemplary embodiment of the inventive concept.

Referring to FIG. 9, in step 903, the occlusion area estimator 410 receives the pattern map which is a result of detecting the object or areas having periodicity in the input video and, in step 905, the occlusion area estimator 410 estimates the occlusion area by using the pattern map to determine whether the area having the periodicity is adjacent to the area not having the periodicity.

In step 907, the noise MV remover 430 receives the MV field according to a previous ME result and, in step 909, the noise MV remover 430 removes MVs which correspond to the estimated occlusion area from the input MV field and outputs the remaining MVs as the first candidate MVs. Here, in step 911, the noise MV remover 430 detects the MV which represents the input MV field. A method of detecting the MV may use a K-mean clustering method as described in FIG. 7.

In step 913, the noise MV remover 430 compares respective values of the first candidate MVs with a value of the representative (average value) MV and, in step 915, removes, from among the first candidate MVs, the first candidate MV which has a difference from the representative MV which is greater than the preset threshold value and outputs the remaining MVs as the second candidate MVs. In step 917, the ME processor 450 performs the ME operation by using the second candidate MVs. Here, the ME processor 450 may perform the ME operation within the adjusted search range and the adjusted search range may be calculated by using the above Equation 1.

As described above, the exemplary embodiments may effectively remove the occlusion area in the input video by using the pattern map of the input video. In addition, from among the candidate MVs from which MVs corresponding to the location of the occlusion area are removed, final candidate MVs, which are obtained by additionally removing MVs which are opposite to a local motion of the object, are used when performing the ME operation, thereby outputting an accurate ME as a result of the process.

Figures 10A, 10B:
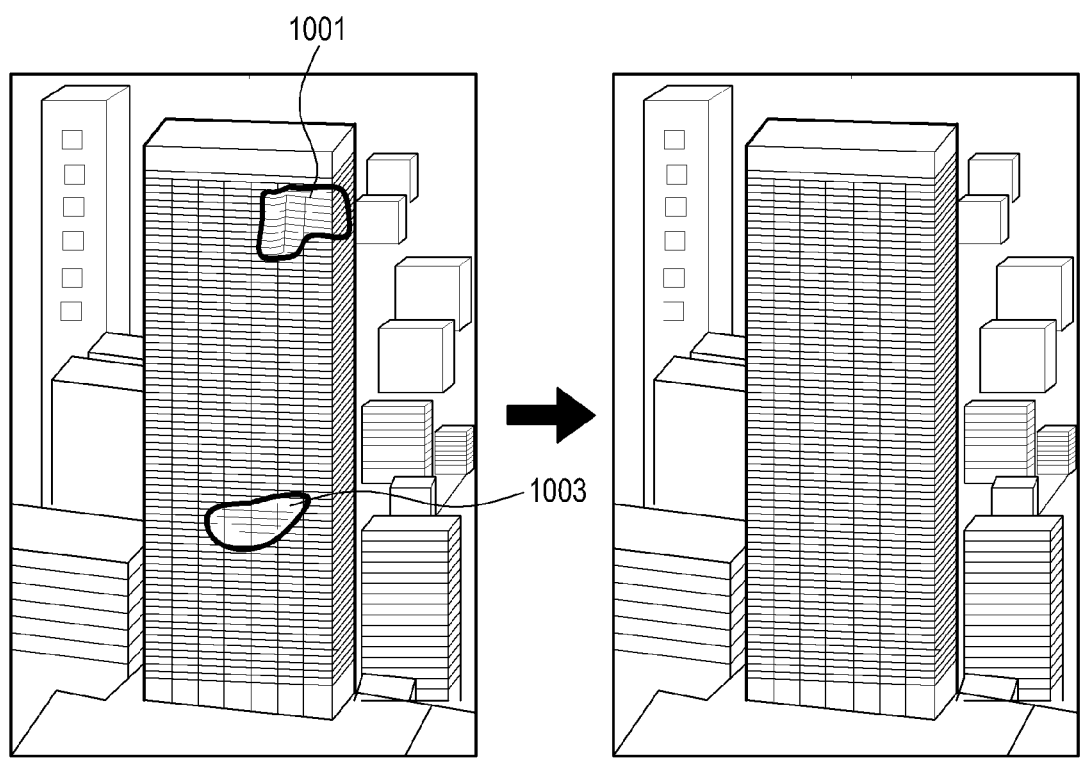
FIGS. 10A and 10B are views illustrating a comparison between an image to which a known ME method is applied and an image to which an ME method according to an exemplary embodiment of the inventive concept is applied.

FIGS. 10A and 10B are views illustrating a comparison between an image to which a known ME method is applied and an image to which an ME method according to an exemplary embodiment of the inventive concept is applied.

Referring to FIGS. 10A and 10B, compared to an image of FIG. 10A to which the known ME method is applied, FIG. 10B shows an image to which the ME method according to an exemplary embodiment is applied has an accurate ME result output in an area having the periodic characteristic, thereby producing a positive effect in the result of the video processing, which represents a final product.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of estimating a motion of a video in a video system, the method comprising:
   estimating an occlusion area by using a pattern map which results from the detection of an object or areas having a repeatability of a specific pattern in an image of an input video;
   removing from a motion vector field a motion vector which corresponds to the estimated occlusion area according to a result of a previously performed motion estimation and outputting remaining motion vectors as first candidate motion vectors;
   collecting motion vectors from the motion vector field which correspond to an area of interest in the input video, detecting a representative motion vector which represents the collected motion vectors, and respectively comparing first candidate motion vectors with the representative motion vector;
   removing a first candidate motion vector having a difference in a weight value which is greater than a first threshold value from the representative motion vector and outputting the remaining first candidate motion vectors as second candidate motion vectors; and
   performing a motion estimation operation by using the second candidate motion vectors.

2. The method of claim 1, wherein the pattern map results from detecting an object or an area having the repeatability of the specific pattern in the image of the input video by analyzing a characteristic of the input video in a temporal, spatial or frequency domain.

3. The method of claim 1, wherein estimating the occlusion area comprises:
   using the pattern map to determine whether an area having the repeatability of the specific pattern in the image of the input video is adjacent to an area not having a repeatability of another specific pattern; and
   decreasing a weight value of a motion vector which corresponds to the area not having the repeatability of the specific pattern when the area having the repeatability of the specific pattern is adjacent to the area not having the repeatability of another specific pattern.

4. The method of claim 3, wherein outputting the first candidate motion vectors comprises:
   verifying a motion vector having a weight value less than a second threshold value as the motion vector which corresponds to the estimated occlusion area; and
   removing the verified motion vector from the motion vector field to output the remaining motion vectors as the first motion vectors.

5. The method of claim 1, wherein performing the motion estimation comprises:
   adjusting a search range; and
   performing the motion estimation operation by using the second candidate motion vectors in the adjusted search range.

6. An apparatus for estimating a motion of an image in a video system, the apparatus comprising:
   an occlusion area estimator which estimates an occlusion area by using a pattern map which is a result of detecting in an image of an input video an object or an area having a repeatability of a specific pattern;
   a noise remover which removes a motion vector which corresponds to the estimated occlusion area from a motion vector field according to a result of previously performed motion estimation to output remaining motion vectors as first candidate motion vectors, the noise remover collects motion vectors from the motion vector field which correspond to an area of interest in the input video, detects a representative motion vector which represents the collected motion vectors in order to respectively compare the first candidate motion vectors with the representative motion vector, and removes a first candidate motion vector having a difference in a weight value from the representative motion vector which is greater than a first threshold value in order to output the remaining first candidate motion vectors as second candidate motion vectors; and a motion estimation processor which performs a motion estimation operation by using the second candidate operation vectors.

7. The apparatus of claim 6, wherein the noise remover comprises:
a first occlusion area remover which receives the motion vector field and the pattern map and outputs the first candidate vectors;
a pattern area motion statistical processor which receives the motion vector field and calculates the representative motion; and
a second occlusion area remover which outputs the second candidate motion vectors.

8. The apparatus of claim 6, wherein the pattern map results from detecting an object or an area having repeatability of the specific pattern within the image the input video by analyzing a characteristic of the input video in a temporal, spatial or frequency domain.

9. The apparatus of claim 6, wherein the occlusion area estimator uses the pattern map to determine whether an area having the repeatability of the specific pattern included in the image of the input video is adjacent to an area not having a repeatability of another specific pattern, and
the occlusion area estimator decreases a weight value of a motion vector which corresponds to the area not having the repeatability of another specific pattern when the area having the repeatability of the specific pattern is adjacent to the area not having the repeatability of another specific pattern.

10. The apparatus of claim 7, wherein the first occlusion area remover verifies a motion vector having a weight value less than a second threshold value as the motion vector which corresponds to the estimated occlusion area, and
the occlusion area remover removes the verified motion vector from the motion vector field to output the remaining motion vectors from the first candidate motion vectors.

11. The apparatus of claim 6, wherein the motion estimation processor adjusts a search range and performs the motion estimation operation by using the second candidate motion vectors in the adjusted search range.

* * * * *